(12) United States Patent
Arata

(10) Patent No.: US 7,216,835 B2
(45) Date of Patent: May 15, 2007

(54) AIRCRAFT WITH EXTENDABLE LEADING EDGE OF FUSELAGE AND WINGS

(75) Inventor: Allen A. Arata, Los Angeles, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 97 days.

(21) Appl. No.: 11/066,341

(22) Filed: Feb. 25, 2005

(65) Prior Publication Data

US 2007/0069084 A1   Mar. 29, 2007

(51) Int. Cl.
 *B64C 3/50* (2006.01)
(52) U.S. Cl. ..................................... 244/214
(58) Field of Classification Search ...... 244/12.1–12.2, 244/23 A–23 C, 17.21, 36–38, 34 A, 119, 244/214, 218, 45 R, 46, 198, 99.12, 35 A
See application file for complete search history.

(56) References Cited

U.S. PATENT DOCUMENTS

| 1,215,295 | A | * | 2/1917 | MacKay | ...................... 244/218 |
| 1,353,666 | A | * | 9/1920 | Page | ......................... 244/210 |
| 1,414,200 | A | | 4/1922 | Page | |
| 1,427,012 | A | | 8/1922 | Page | |
| 1,606,117 | A | * | 11/1926 | Caples | ........................ 244/218 |
| 1,730,249 | A | * | 10/1929 | Smith | ......................... 244/218 |
| 1,818,000 | A | | 8/1931 | Moles | |
| 1,867,013 | A | | 7/1932 | Kratzer | |
| 1,891,261 | A | | 12/1932 | Gunn | |
| 1,945,254 | A | | 1/1934 | Bittner | |
| 2,500,512 | A | | 3/1950 | Bowers | |
| 2,793,826 | A | | 5/1957 | Fielder | |
| 3,153,523 | A | | 10/1964 | Lowman III | |
| 3,170,657 | A | | 2/1965 | Riebe et al. | |
| 3,425,650 | A | * | 2/1969 | Silva | ......................... 244/130 |
| 3,447,761 | A | | 6/1969 | Whitener et al. | |
| 3,486,720 | A | | 12/1969 | Seglem et al. | |
| 3,572,617 | A | * | 3/1971 | Ricard | ......................... 244/46 |

(Continued)

FOREIGN PATENT DOCUMENTS

EP        0538963 B1      3/1997

(Continued)

OTHER PUBLICATIONS http://www.b737.org.uk/flightcontrols.htm (available on the web Oct. 20, 2001).*
http://www.aircraftresourcecenter.com/AWA1/001-100/walk070_F14/part2/images/doc2-021.jpg (available on the web ca. 2000).*

*Primary Examiner*—Teri Pham Luu
*Assistant Examiner*—Edward J. Mayle
(74) *Attorney, Agent, or Firm*—Alan G. Towner, Esq.; Pietragallo, Bosick & Gordon LLP

(57) ABSTRACT

An extendable leading edge for the fuselage and wings of an aircraft is disclosed. The leading edge may be extended from a retracted position adjacent to the fuselage and wings to an extended position. In the extended position, the leading edge increases lift of the aircraft at low speeds. In the retracted position, gaps associated with the leading edge are avoided.

11 Claims, 3 Drawing Sheets

U.S. PATENT DOCUMENTS

| | | | |
|---|---|---|---|
| 3,630,471 A * | 12/1971 | Fredericks | 244/36 |
| 3,638,886 A | 2/1972 | Zimmer | |
| 3,847,369 A | 11/1974 | Phillips et al. | |
| 4,008,867 A | 2/1977 | Kaniut | |
| 4,161,300 A | 7/1979 | Schwaerzler et al. | |
| 4,267,990 A | 5/1981 | Staudacher | |
| 4,384,693 A | 5/1983 | Pauly et al. | |
| 4,494,713 A * | 1/1985 | Kim | 244/15 |
| 4,585,192 A | 4/1986 | Clifford-Jones | |
| 4,667,898 A * | 5/1987 | Greenhalgh | 244/46 |
| 4,729,528 A | 3/1988 | Borzachillo | |
| D314,366 S * | 2/1991 | Waaland et al. | D12/333 |
| 5,056,741 A | 10/1991 | Bliesner et al. | |
| 5,062,595 A | 11/1991 | Maxworthy | |
| 5,312,070 A | 5/1994 | Arena | |
| 5,897,076 A | 4/1999 | Tracy | |
| 5,921,506 A | 7/1999 | Appa | |
| 6,068,219 A * | 5/2000 | Arata | 244/219 |
| 6,073,889 A | 6/2000 | Dees et al. | |
| 6,129,308 A | 10/2000 | Nastasi et al. | |
| 6,213,433 B1 | 4/2001 | Gruensfelder et al. | |
| 6,220,551 B1 | 4/2001 | Saiz | |
| 6,286,790 B1 | 9/2001 | Thorpe | |
| 6,328,265 B1 | 12/2001 | Dizdarevic | |
| 6,343,768 B1 * | 2/2002 | Muldoon | 244/7 R |
| 6,375,126 B1 | 4/2002 | Sakurai et al. | |
| 6,475,933 B1 | 11/2002 | Brown et al. | |
| 6,634,594 B1 * | 10/2003 | Bowcutt | 244/35 A |
| 2002/0195527 A1 | 12/2002 | Broadbent | |
| 2004/0079839 A1 * | 4/2004 | Bath et al. | 244/131 |

FOREIGN PATENT DOCUMENTS

| | | |
|---|---|---|
| EP | 0781704 B1 | 5/2002 |
| GB | 2003807 A | 3/1979 |
| GB | 2100684 A | 1/1983 |
| WO | WO 97/49607 | 12/1997 |

* cited by examiner

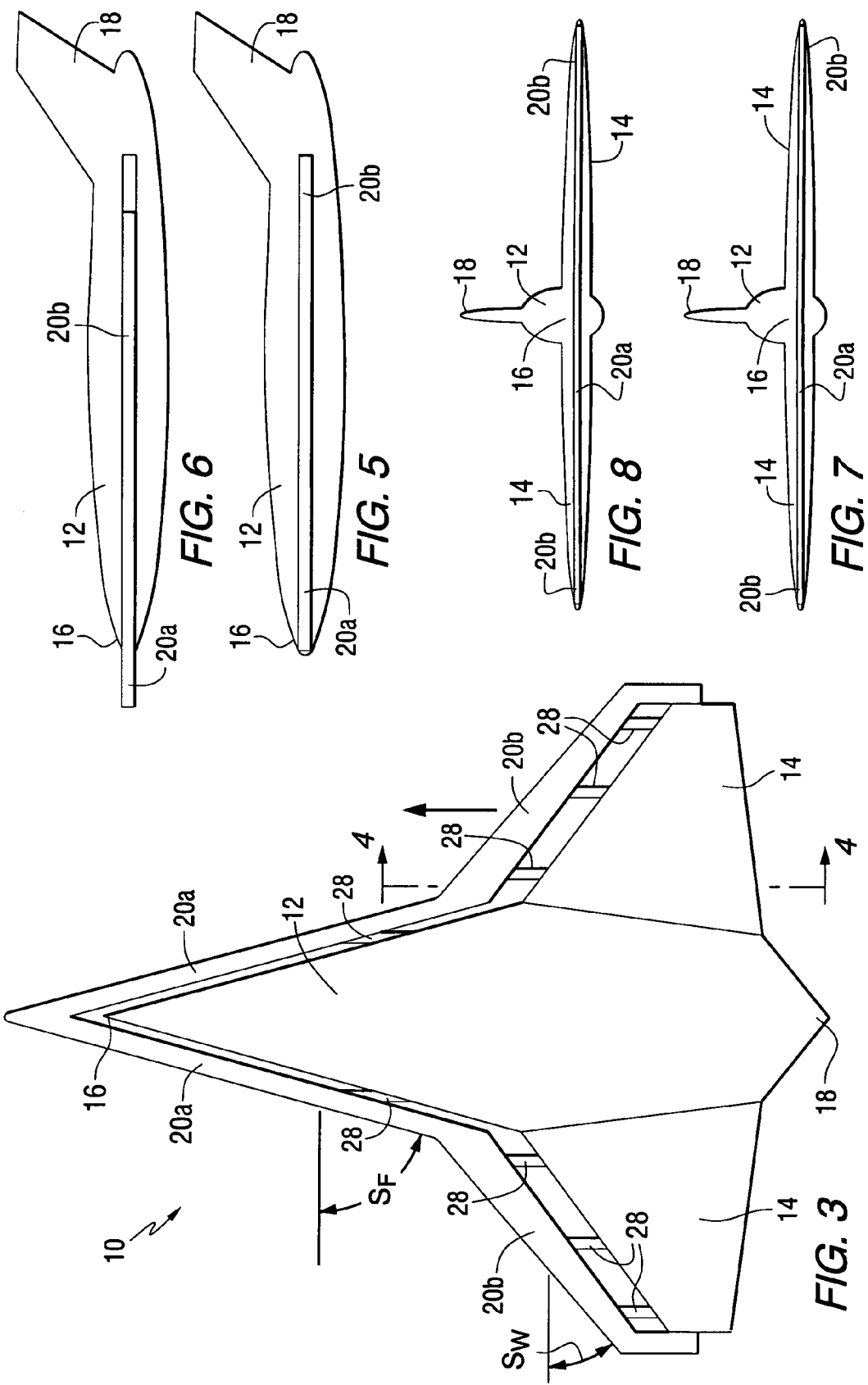

AIRCRAFT WITH EXTENDABLE LEADING EDGE OF FUSELAGE AND WINGS

FIELD OF THE INVENTION

The present invention relates to aircraft with an extendable leading edge, and more particularly relates to a combined fuselage and wing leading edge which can be moved from a retracted position against the fuselage and wings to an extended position which provides increased lift for the aircraft at low speeds.

BACKGROUND INFORMATION

Aircraft often utilize devices on leading wing edges in order to increase lift at low speeds. For example, aircraft with high leading edge wing sweep may use devices on the leading edges of the wings to increase lift during takeoff and landing and thus reduce runway length. Such leading edge devices typically have gaps that are visible from the front when the devices are stowed. However, some aircraft have survivability requirements that do not allow leading edge gaps when the devices are stowed. It would be desirable to provide a leading edge device which avoids such problems.

SUMMARY OF THE INVENTION

The present invention provides an extendable leading edge for the fuselage and wings of an aircraft. The leading edge may be moved from a retracted position adjacent to the fuselage and wings to an extended position away from the fuselage and wings which increases lift of the aircraft, particularly during takeoff, landing and other low speed operations. When the leading edge is retracted during flight, unwanted gaps are avoided.

An aspect of the present invention is to provide an aircraft comprising a fuselage, wings connected to the fuselage, and a leading edge forwardly extendable from a retracted position against the fuselage and wings to an extended position from the fuselage and wings.

Another aspect of the present invention is to provide an aircraft comprising a fuselage and a leading edge forwardly extendable from a retracted position against the fuselage to an extended position from the fuselage.

These and other aspects of the present invention will be more apparent from the following description.

BRIEF DESCRIPTION OF THE DRAWINGS

FIG. 3 is a partially schematic top view of the aircraft of FIG. 1, with the extendable leading edge in an extended position.

FIG. 5 is a partially schematic side view of an aircraft including an extendable leading edge of the fuselage and wings in a retracted position in accordance with an embodiment of the present invention.

FIG. 6 is a partially schematic side view of the aircraft of FIG. 5, with the extendable leading edge in an extended position.

FIG. 7 is a partially schematic front view of an aircraft including an extendable leading edge of the fuselage and wings in a retracted position in accordance with an embodiment of the present invention.

FIG. 8 is a partially schematic front view of the aircraft of FIG. 7, with the extendable leading edge in an extended position.

In FIG. 12, the Krueger flap is stowed and the leading edge is retracted. In FIG. 13, the Krueger flap remains stowed, but the leading edge is in an extended position. In FIG. 14, the Krueger flap is deployed and the leading edge is in the extended position.

DETAILED DESCRIPTION

Figure 1:
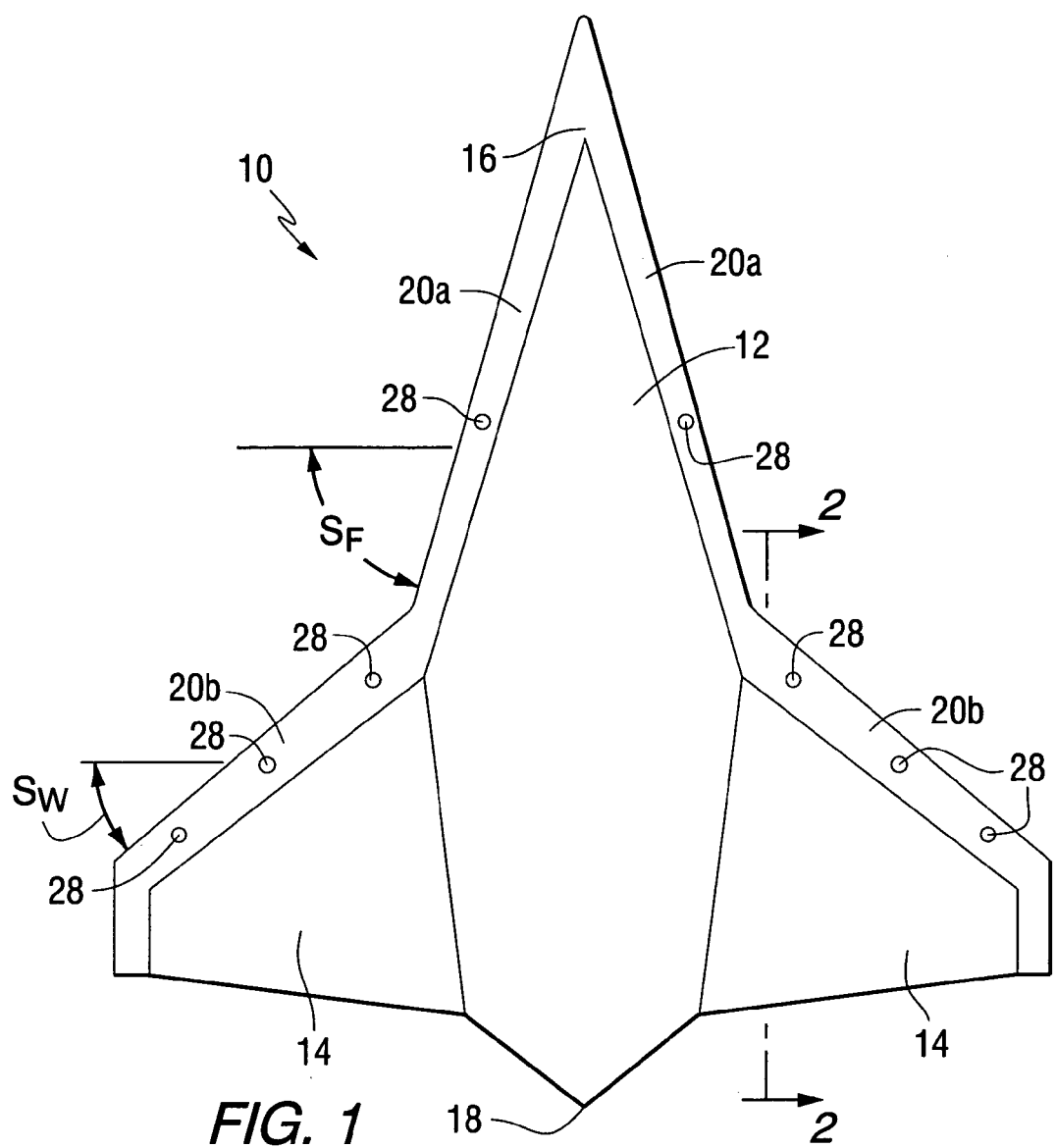
FIG. 1 is a partially schematic top view of an aircraft including an extendable leading edge adjacent to the fuselage and wings of the aircraft in accordance with an embodiment of the present invention.

FIG. 1 is a partially schematic top view of an aircraft 10 including a fuselage 12 and wings 14. The aircraft 10 has a nose section 16 and a tail section 18. As used herein, the term "fuselage" includes the body of an aircraft as well as any structural features integrally formed with the body, such as strakes, leading edge extensions and the like which have leading edges. As shown in FIG. 1, an extendable leading edge in accordance with an embodiment of the present invention includes a portion 20a adjacent to the fuselage 12, and portions 20b adjacent to the wings 14. The leading edge 20a, 20b is extendable in a generally longitudinal direction of the aircraft.

Figure 2:
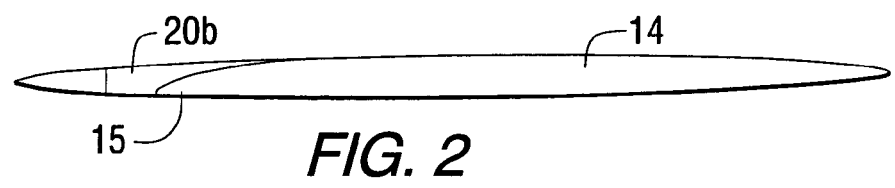
FIG. 2 is a partially schematic cross sectional view taken through section 2—2 of FIG. 1, illustrating a wing of the aircraft and a portion of the leading edge in a retracted position in accordance with an embodiment of the present invention.

FIG. 2 is a cross sectional view of the wing 14 and leading edge 20b, taken through section 2—2 of FIG. 1. In FIGS. 1 and 2, the leading edge 20a, 20b is in a retracted position. In the retracted position, the fuselage portion 20a of the leading edge is seated against the fuselage, and the wing portion 20b of the leading edge is seated against and contacts the wing 14.

Figure 4:
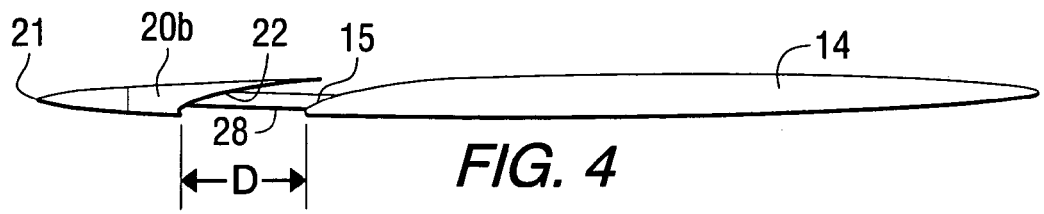
FIG. 4 is a partially schematic cross sectional view taken through section 4—4 of FIG. 3, illustrating the extended position of the leading edge with respect to the wing.

FIGS. 3 and 4 are similar views as shown in FIGS. 1 and 2, respectively, except the leading edge 20a, 20b has been moved forward in the longitudinal direction of the aircraft to an extended position. The extended position of the wing portion of the leading edge 20b is shown in FIG. 4, which is a cross sectional view of the wing 14 taken through line 4—4 of FIG. 3. As shown in FIG. 4, the leading edge 20b is in a forwardly extended position a distance D away from the wing 14. The fuselage portion 20a of the leading edge may also be forwardly extended a similar distance from the fuselage 12.

As can be seen most clearly in FIGS. 1 and 3, the wings 14 of the aircraft 10 have a sweep angle $S_W$ measured from a transverse direction of the aircraft. As can also be seen in FIGS. 1 and 3, the fuselage 12, including strakes and other structures having leading edges, may also have a sweep angle $S_F$ measured from the transverse direction of the aircraft 10. In the embodiment illustrated in FIGS. 1 and 3, the wing sweep angle $S_W$ is different from the fuselage sweep angle $S_F$, i.e., the wing sweep angle $S_W$ is less than the fuselage sweep angle $S_F$.

In the embodiments shown in FIGS. 1 and 3, the wing sweep angle $S_W$ remains constant along the wing 14, and the fuselage sweep angle $S_F$ remains constant along the fuselage 12. However, the wing sweep angle $S_W$ and/or the fuselage sweep angle $S_F$ may vary. Accordingly, although constant wing and fuselage sweep angles $S_W$ and $S_F$ are shown in the present figures, any other desired wing and fuselage configuration may be used in accordance with the present invention.

FIGS. 5 and 6 are partially schematic side views of an aircraft similar to that shown in FIGS. 1 and 3. In FIG. 5, the leading edge 20a, 20b is in the retracted position. In FIG. 6, the leading edge 20a, 20b is in the extended position.

FIGS. 7 and 8 are partially schematic front views of an aircraft similar to that shown in FIGS. 1 and 3. In FIG. 7, the leading edge 20a, 20b is in the retracted position. In FIG. 8, the leading edge 20a, 20b is in the extended position.

The leading edge 20a, 20b may be made of any suitable material. For example, the leading edge may comprise a substantially rigid material such as aluminum or conventional composite materials. The leading edge 20a, 20b preferably has no gaps detectable in the electromagnetic spectrum.

The mechanism used to extend and retract the leading edge 20a, 20b may be any suitable linkage 28, such as a conventional flap screwjack with extending rails to guide the extension. Any suitable controller for actuating the mechanism may be used, such as conventional manually operated controls or automatic controls for extending and retracting the leading edge based on airspeed.

Figure 9:
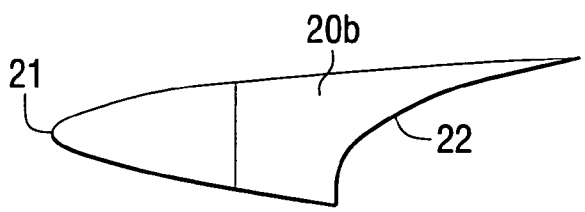
FIG. 9 is a partially schematic cross sectional view of an extendable leading edge having a concave rear contact surface in accordance with an embodiment of the present invention.

FIG. 9 is a partially schematic cross sectional view of the leading edge 20b, which includes a front edge 21 and a rear contact surface 22. In the embodiment shown in FIG. 9, the rear contact surface 22 has a concave shape which conforms with the front edge 15 of the wing 14. Thus, the rear contact surface 22 and the front edge 15 are tightly seated against each other when the leading edge 20b is in the retracted position. This conforming arrangement of the rear contact surface 22 of the leading edge 20b and front edge 15 of the wing 14 can be seen in FIGS. 2 and 4.

As shown in FIGS. 2, 4 and 9, the front edge 21 of the leading edge 20b may have a relatively pointed shape, while the rear contact surface 22 and front edge 15 of the wing 14 may have a relatively rounded shape. Thus, the front edge 21 of the leading edge 20b has a smaller radius of curvature than the front edge 15 of the wing 14. This may be desirable in some aircraft because the rounder front edge 15 of the wing 14 may delay wing stall.

Figure 10:
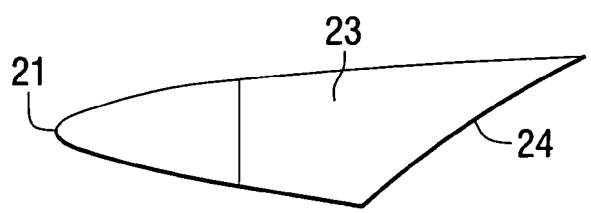
FIG. 10 is a partially schematic cross sectional view of an extendable leading edge having a angled rear contact surface in accordance with an embodiment of the present invention.
Figure 11:
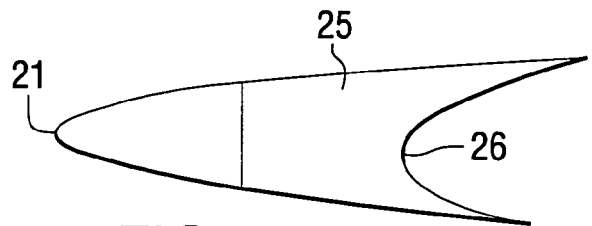
FIG. 11 is a partially schematic cross sectional view of an extendable leading edge having a generally parabolic contact surface in accordance with an embodiment of the present invention.

FIGS. 10 and 11 illustrate alternative rear contact surface shapes of leading edges in accordance with embodiments of the present invention. In FIG. 10, the leading edge 23 has an angled contact surface 24. In FIG. 11, the leading edge 25 has a generally parabolic contact surface 26.

Figure 14:
FIGS. 12–14 are partially schematic cross sectional views of an aircraft wing including a Krueger flap and an extendable leading edge in accordance with an embodiment of the present invention.
Figure 13:
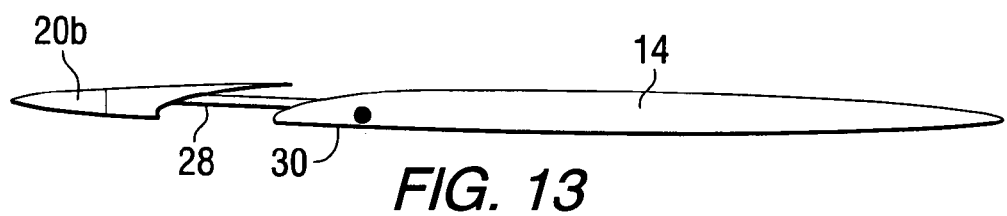
Figure 12:
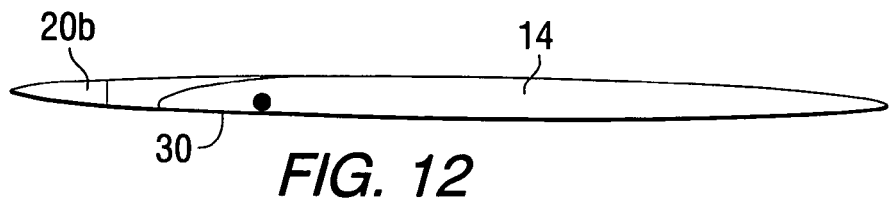

FIGS. 12–14 illustrate an embodiment of the present invention in which a conventional Krueger flap 30 is rotatably mounted on the wing 14. In FIG. 12, the leading edge 20b is in the retracted position, and the Krueger flap 30 is in the stowed position. In FIG. 13, the leading edge 20b is extended from the wing, while the Krueger flap 30 remains stowed. In FIG. 14, the leading edge 20b is extended and the Krueger flap 30 is rotated into a deployed position. Any known Krueger flap design and deployment mechanism may be used in accordance with this embodiment of the invention.

Whereas particular embodiments of this invention have been described above for purposes of illustration, it will be evident to those skilled in the art that numerous variations of the details of the present invention may be made without departing from the invention as defined in the appended claims.

What is claimed is:

1. An aircraft comprising:
   a fuselage;
   wings connected to the fuselage; and
   a unitary leading edge forwardly extendable in a direction substantially parallel with a longitudinal direction of the aircraft from a retracted position against the fuselage and wings to an extended position from the fuselage and wings, wherein the leading edge comprises a fuselage portion which forms a leading edge of the fuselage and wing portions which form leading edges of the wings.

2. The aircraft of claim 1, wherein the leading edge comprises a rigid structure.

3. The aircraft of claim 1, wherein the wing portions of the leading edge have wing sweep angles measured from a transverse direction of the aircraft, the fuselage portion of the leading edge has a fuselage sweep angle measured from the transverse direction of the aircraft, and the wing sweep angles are different from the fuselage sweep angle.

4. The aircraft of claim 3, wherein the wing sweep angles are less than the fuselage sweep angle.

5. The aircraft of claim 1, wherein the leading edge comprises a rear contact surface which contacts the fuselage and wings when the leading edge is in the retracted position.

6. The aircraft of claim 5, wherein the rear contact surface has a shape which substantially conforms with a shape of the fuselage and a shape of the wings in areas of contact between the leading edge and the fuselage and wings.

7. The aircraft of claim 6, wherein at least a portion of the rear contact surface is concave.

8. The aircraft of claim 7, wherein the rear contact surface of the leading edge contacts a curved front edge of at least one of the wings, and the front edge of the wing has a larger radius of curvature than a front edge of the leading edge.

9. The aircraft of claim 5, wherein at least a portion of the rear contact surface is flat.

10. The aircraft of claim 1, further comprising Krueger flaps rotatably mounted on the wings.

11. The aircraft of claim 10, wherein the Krueger flaps are rotatable to deployed positions when the leading edge is in the extended position, and the Krueger flaps are rotatable to stowed positions when the leading edge is in the retracted position.

* * * * *